(12) United States Patent
Roethig et al.

(10) Patent No.: US 8,238,413 B2
(45) Date of Patent: Aug. 7, 2012

(54) ADAPTIVE EQUALIZER FOR HIGH-SPEED SERIAL DATA

(75) Inventors: Wolfgang Roethig, San Jose, CA (US); Genady Veytsman, Netanya (IL)

(73) Assignee: TranSwitch Corporation, Shelton, CT (US)

( * ) Notice: Subject to any disclaimer, the term of this patent is extended or adjusted under 35 U.S.C. 154(b) by 157 days.

(21) Appl. No.: 12/821,950

(22) Filed: Jun. 23, 2010

(65) Prior Publication Data

US 2011/0317751 A1 Dec. 29, 2011

(51) Int. Cl.
*H03H 7/30* (2006.01)

(52) U.S. Cl. ........ 375/232; 375/229; 375/231; 375/233; 375/234; 375/355; 375/370; 375/373; 375/374; 375/375; 375/376

(58) Field of Classification Search .......... 375/232, 375/229, 231, 233, 234, 355, 370, 374, 375, 375/376; 333/18, 28; 708/300, 819
See application file for complete search history.

(56) References Cited

U.S. PATENT DOCUMENTS

| 7,912,119 B2 * | 3/2011 | Chen et al. ............. 375/232 |
| 7,916,780 B2 * | 3/2011 | Lee ....................... 375/232 |
| 8,074,126 B1 * | 12/2011 | Qian et al. ............. 714/704 |
| 2005/0195894 A1 | 9/2005 | Kim et al. |
| 2007/0201546 A1 | 8/2007 | Lee |
| 2008/0247452 A1 | 10/2008 | Lee |
| 2010/0329325 A1 * | 12/2010 | Mobin et al. .......... 375/232 |

* cited by examiner

*Primary Examiner* — Dhaval Patel
(74) *Attorney, Agent, or Firm* — Myers Wolin, LLC

(57) ABSTRACT

An adaptive equalizer for high-speed serial data comprises a programmable equalizer for equalizing an input serial data signal to generate an equalized serial data signal, wherein the equalization is based on an optimal equalization mode; a signal quality meter for computing an eye width indication based on the equalized serial data signal, wherein the eye width indication is an indicative of the quality of the equalized serial data signal; and a decision unit for determining the optimal equalization mode based on the eye width indication.

13 Claims, 6 Drawing Sheets

ADAPTIVE EQUALIZER FOR HIGH-SPEED SERIAL DATA

TECHNICAL FIELD

This invention generally relates to processing and equalizing high-speed serial data.

BACKGROUND OF THE INVENTION

High-speed interface links connecting a source device to a sink device over a physical cable are typically serial communication links. Examples for such links include, but are not limited to, a high-definition multimedia interface (HDMI), a digital video interface (DVI), DisplayPort (DP), digital interface for video and audio (DiiVA), Universal Serial Bus 3 (USB3), and others. A receiver at the sink device recovers data and clock signals transmitted over the cable using a clock data recovery (CDR) circuit. Typically, the physical cable exhibits the characteristics of a low-pass filter. Therefore, the amplitude of the recovered data, received at the receiver, is attenuated and the phase is distorted. Also, the physical cable typically consists of wires which are not perfectly shielded. Thus, noise is present in the recovered data due to cross-coupling between signals from different wires.

Adaptive equalizers are used to restore signal integrity by compensating for the frequency dependent attenuation that occurs during transmission of serial data over the physical cable. However, circuitry for performing the attenuation estimation needed for adaptive equalization has been complex and difficult to implement, specifically when estimating the attenuation of data transmitted over each of two or more channels of a multi-channel serial link, in order to perform adaptive equalization of the data transmitted over each channel.

An equalizer can generally be modeled as a filter. If the cable over which a signal is transmitted has a transfer function $H(s)$, where 's' is the complex frequency, the ideal filter has the inverse transfer function $H^{-1}(s)$. Additionally, if noise is injected into the transmission system, the ideal filter should reject such noise as long as the noise is outside the bandwidth of the useful signal. If the noise is inside the bandwidth of the useful signal, a trade-off can be made about the degree of noise rejection together with the useful signal portion. The optimal trade-off would be such that the signal-to-noise ratio is maximized. Thus, the problem of adaptive equalization is two-fold: estimation of the inverse signal transfer function and estimation of the optimal noise rejection function.

Conventional adaptive equalizers typically examine the eye diagram of the input serial data and equalize the input data accordingly. For example, US Patent Application Publication No. 2008/0247452 to Lee, et al. (hereinafter Lee) teaches an adaptive equalizer that uses a 2-times oversampling Bang-Bang phase detector. Such a phase detector recovers the input data and generates binary timing information (Up/Down) indicating the timing of the edge clock compared to the center clock in the recovered input data. A data decode block then decodes the Up/Down timing information and the data pattern and determines whether the UP/Down timing information and the data pattern output by the phase decoder indicate a need to increase the equalization coefficients of an equalizer core. The equalizer core receives the input data and provides the equalized data, based on the equalization coefficients set for the equalizer. A bang-bang phase detector has very high jitter. It treats every positive phase shift as 180° and every negative phase shift as −180°. On the other hand, a linear phase detector (e.g., a Hogge phase detector) would measure the phase more accurately and thus provide better information for choosing the optimal equalizer.

The limitations of conventional adaptive equalizers, such as that disclosed in Lee include their limited performance and inability to efficiently equalize high rate serial data. These limitations result, in part, from the 2-times oversampling phase detector, which leads to a binary correction. Specifically, for high transmission rate, e.g., 3 Gbps and above, it is almost impossible to lock on a received signal. Thus, the phase detector in most cases would be out of range. Furthermore, the limitations of conventional adaptive equalizers prohibit the utilization of low-cost and low-quality physical cables for the multimedia interface. In addition, the length of the physical cable is limited. As with any interconnect, signal attenuation and interference of such cables increase with cable length and the signal-to-noise ratio decreases with cable length. Thus, when implementing the conventional adaptive equalizer in a receiver of a multimedia interface, low-cost, low-quality, and long distance physical cables cannot be utilized, as conventional adaptive equalizers are incapable of properly restoring receiver signals.

It would be, therefore, advantageous to provide an improved adaptive equalizer for high-speed serial links.

SUMMARY OF THE INVENTION

Certain embodiments of the invention include an adaptive equalizer for high-speed serial data. The adaptive equalizer comprises a programmable equalizer for equalizing an input serial data signal to generate an equalized serial data signal, wherein the equalization is based on an optimal equalization mode; a signal quality meter for computing an eye width indication based on the equalized serial data signal, wherein the eye width indication is an indicative of the quality of the equalized serial data signal; and a decision unit for determining the optimal equalization mode based on the eye width indication.

Certain embodiments of the invention further include a method for adaptively equalizing high-speed serial data. The method comprises equalizing an input serial data signal to generate an equalized serial data signal, wherein the equalization is based on an optimal equalization mode; generating an eye width indication based on the equalized serial data signal, wherein the eye width indication is an indicative of the quality of the equalized serial data signal; and determining the optimal equalization mode based on the eye width indication.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
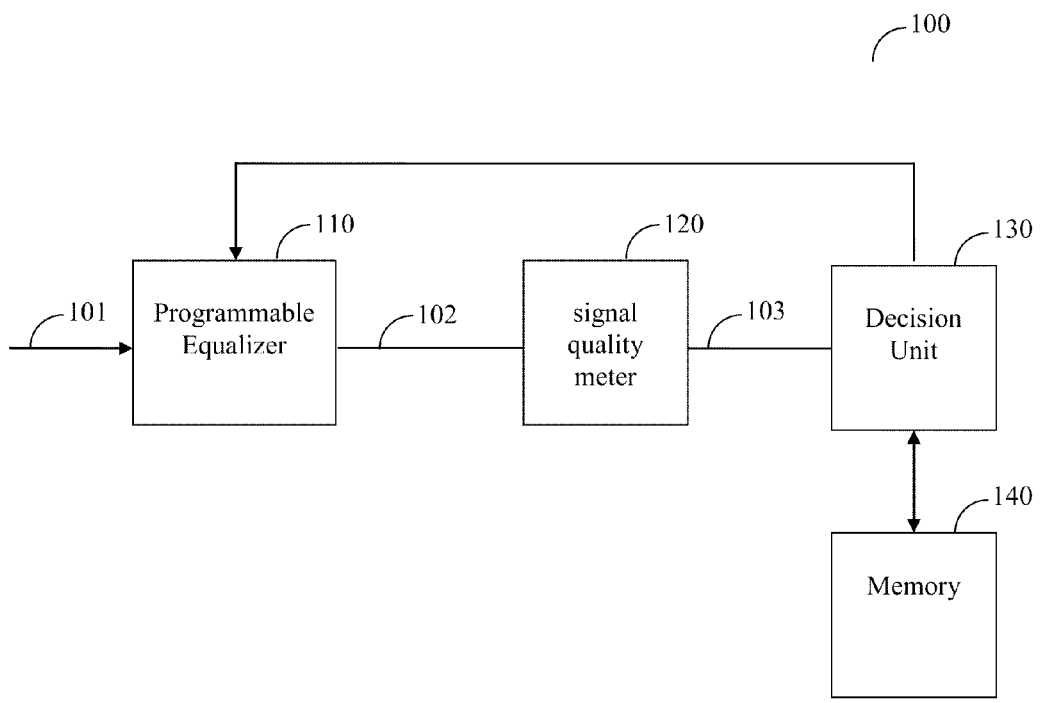
FIG. 1 is a block diagram of an adaptive equalizer in accordance with an embodiment of the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting block diagram of an adaptive equalizer 100 in accordance with an embodiment of the invention. The adaptive equalizer 100 includes a programmable equalizer 110, a signal quality meter 120, a decision unit 130, and a read-only memory 140. The programmable equalizer 110 adjusts the shape of the input serial data signals 101 to generate equalized serial data signals 102 for the signal quality meter 120. The programmable equalizer 110 typically implements an inverse transfer function of the physical cable and includes passive electrical components, such as capacitor-inductor or resistor-capacitor circuits and possibly active electrical components, such as voltage sources or current sources. In accordance with an embodiment of the invention, in order to support a variety of physical cables, each of which has a different transfer function, the programmable equalizer 110 is designed to support a variety of transfer functions. With this aim, the programmable equalizer 110 can be set to different equalization modes. Each mode defines a set of parameters defining the selections and values of components of the programmable equalizer 110. The parameters associated with each equalization mode are stored in the memory 140.

The input serial data signals 101 are high-speed signals transmitted at a transfer rate of typically 3 Gbps or more over a physical cable connecting a source device and a sink device. The input serial data signal 101 may be compliant with at least one of the following standards: a HDMI, DisplayPort, Universal Serial Bus 3 (USB3), PCIe, PCI-x, and the like.

The signal quality meter 120 generates an eye width indication 103 based on equalized serial data signals 102. The eye width indication is a metric for the quality of the input signal 101. In one embodiment of the invention, the eye width can be measured in the horizontal direction by sampling the signal 102 in the time domain. In another embodiment, the eye width can be measured in the vertical direction by sampling the signal 102 in the voltage domain.

Figure 2A:
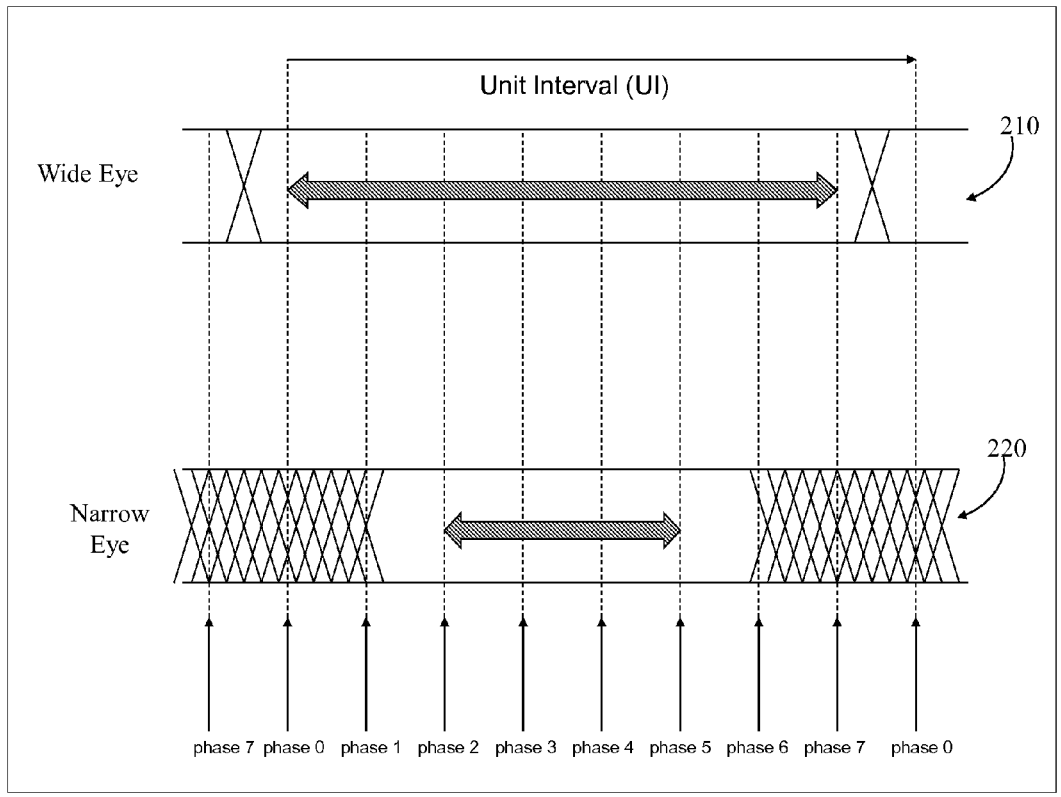
FIGS. 2A and 2B illustrate eye diagrams of a wide eye and a narrow eye in horizontal and vertical directions.

In the time, a serial data bit, present during one unit interval (UI) of a signal 102, is sampled in N phases. If the eye is wide, most of the phases sample the correct value of the data bit. If the eye is narrow, only a few phases in the center of the eye sample the correct value of the data bit. For example, FIG. 2A shows eye diagrams 210 and 220 presenting respectively a wide eye and a narrow eye for 8 (N=8) phase samples. The horizontal eye width indication 103 can be defined as the number of contiguous phases for which no bit transitions are observed, e.g., phases 0-7 in diagram 210 and phases 2-5 in diagram 220.

Figure 2B:
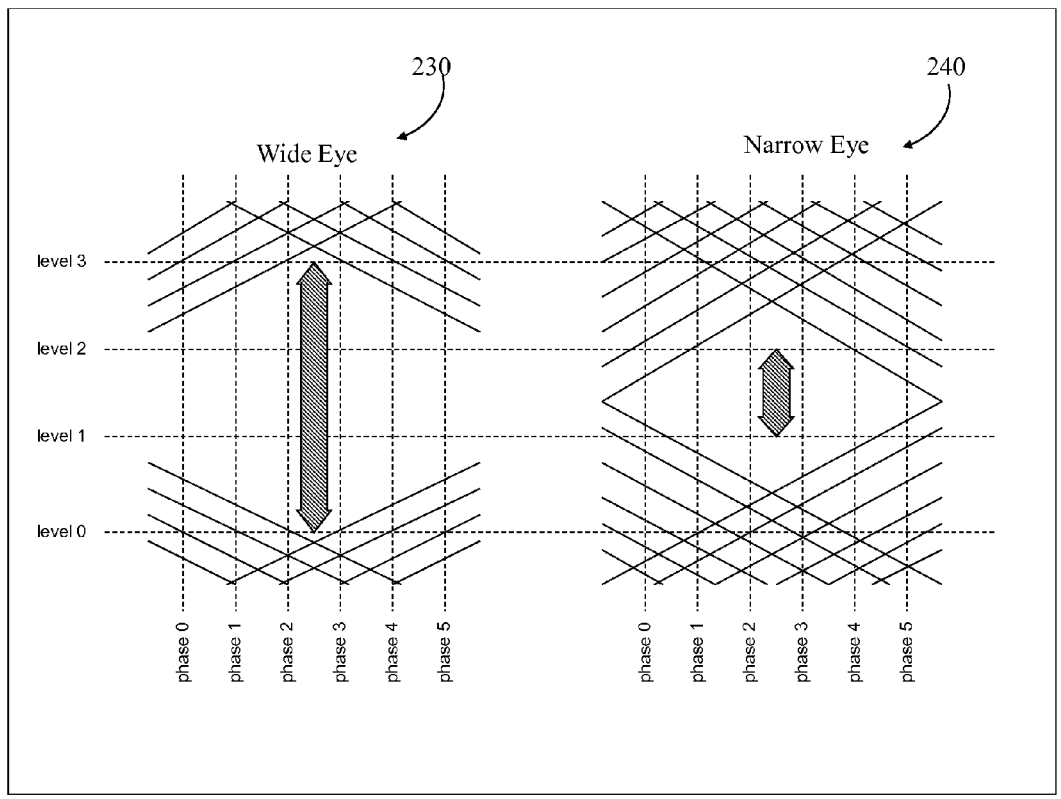

FIG. 2B shows eye diagrams 230 and 240 respectively present a wide eye and a narrow eye measured in the voltage domain. The vertical eye width indication can be defined as the number of voltage levels reached by the signal. Counters are used to indicate how often each voltage level is reached. A counter value of zero indicates a certain voltage level is never reached. Without restriction of generality, the eye width can be represented as a weighted sum of horizontal and vertical eye width. In the case that only horizontal eye width is used, the weighting factor for vertical eye width is zero. It should be noted that in both cases (vertical and horizontal), the eye width depends on both the signal attenuation and the injected noise, the eye width indication is suitable for identifying the programmable equalizer 110 with the best signal transfer function and the best noise transfer function.

Figure 4:
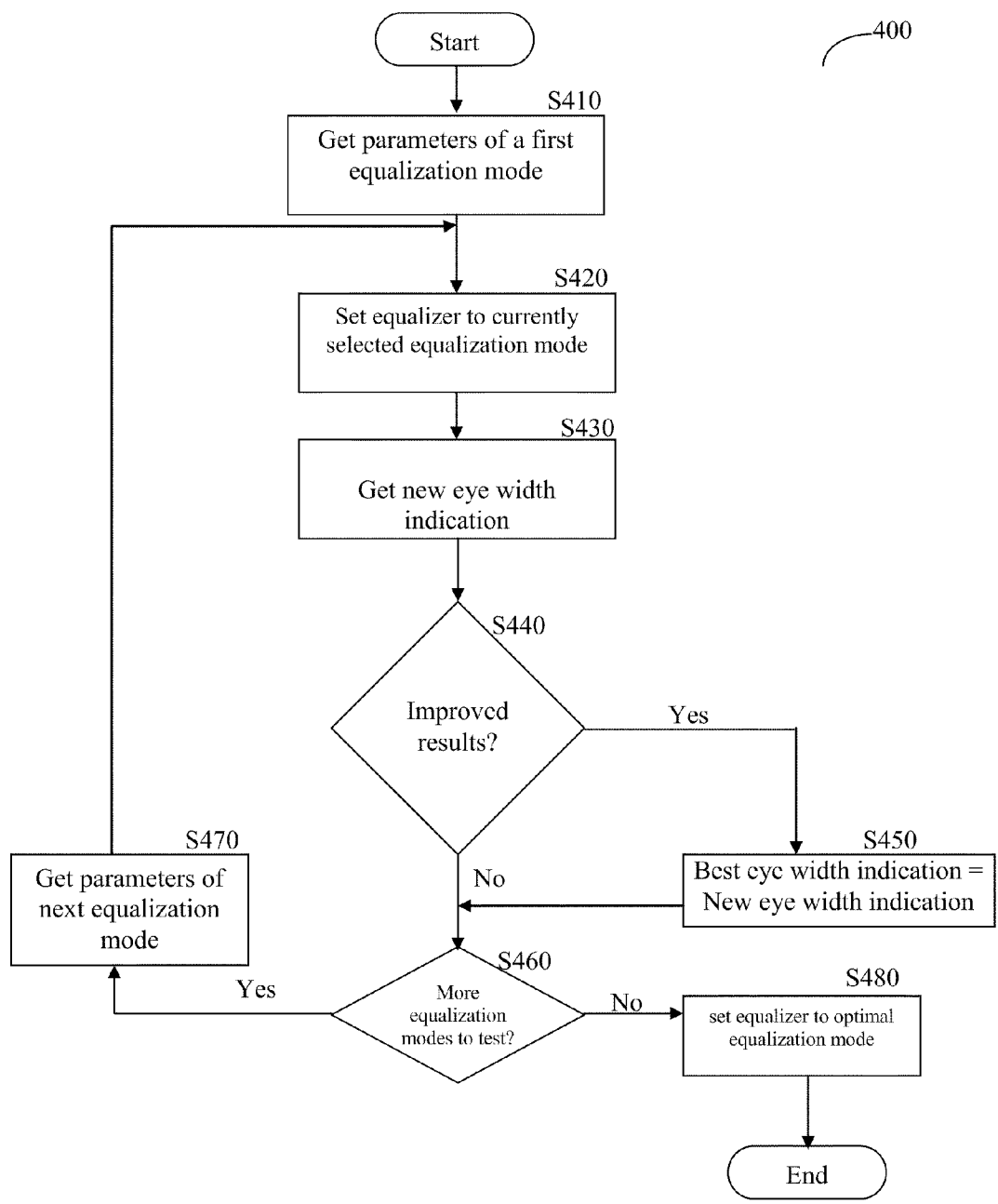
FIG. 4 is a flowchart depicting a decision process performed by the decision unit in accordance with an embodiment of the invention.

The eye width indication 103 is fed to the decision unit 130 which based on this input determines and sets the programmable equalizer 110 with the optimal equalization mode. The decision unit 130 executes a process that analyzes the eye width indication 103 which is the indicative of the quality of the equalized serial data signals 102 for the current equalization mode, and changes the equalization mode of the programmable equalizer until the optimal equalization mode is found. The decision process is described in greater detail with reference to FIG. 4.

Figure 3:
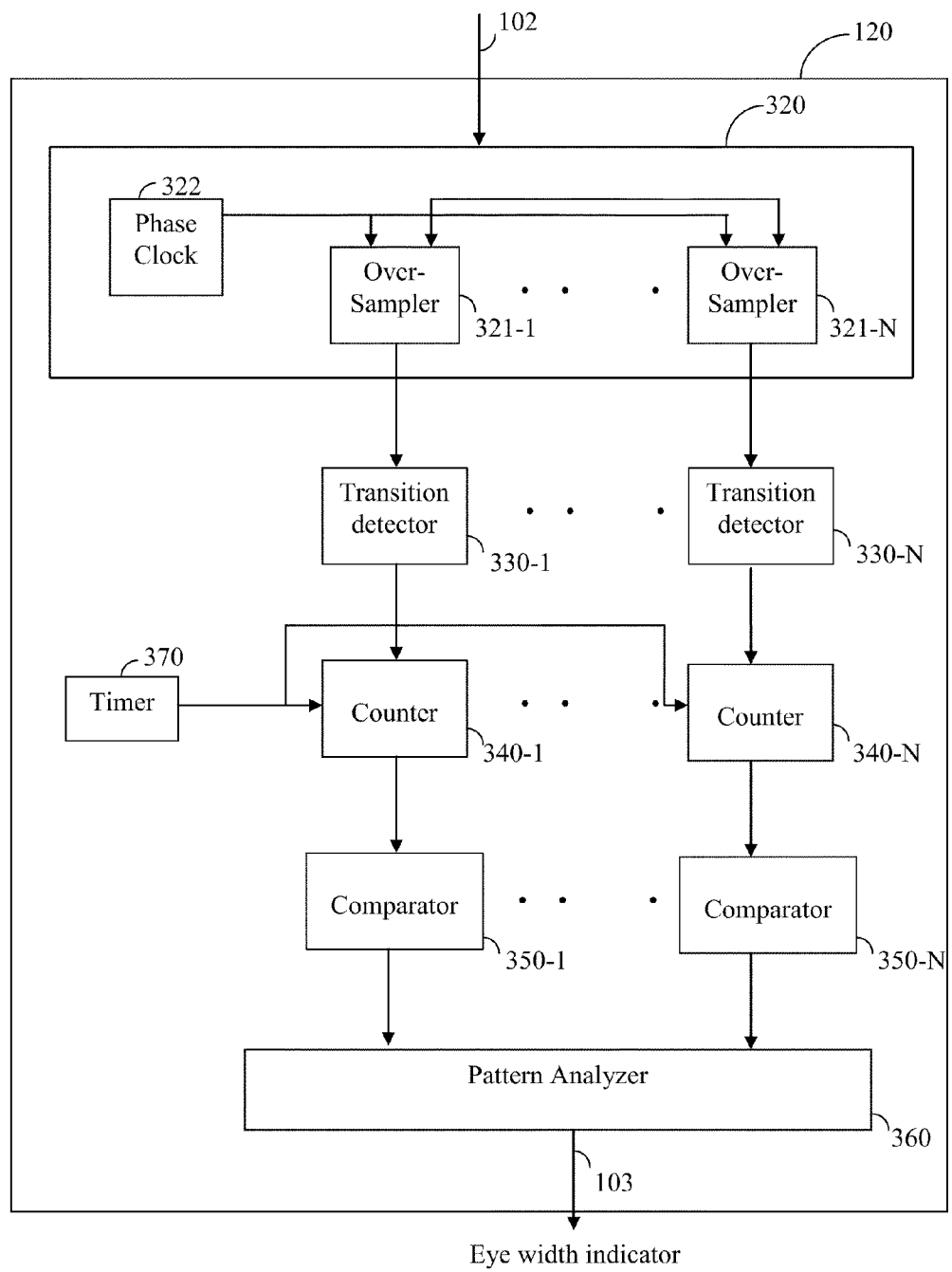
FIG. 3 is a block diagram of the signal quality measurement unit in accordance with an embodiment of the invention.

FIG. 3 shows an exemplary and non-limiting block diagram of the signal quality meter 120 implemented in accordance with an embodiment of the invention. The signal quality meter 120 includes a clock and data recovery (CDR) circuit 320, N transition detectors 330-1 through 330-N, N counters 340-1 through 340-N, N comparators 350-1 through 350-N, a pattern analyzer 360, and a timer 370 that times a programmable counting period.

The CDR circuit 320 recovers the equalized serial data signals 102 by using N over-samplers 321-1 through 321-N and an N-phase sampling clock 322. The parameter N defines the number of sampled phases and is always greater than 2. Each sampling signal generated by the clock 322 is shifted in phase by a factor 1/N of the clock cycle with respect to the preceding signal. The over-samplers 321-1 through 321-N receive an equalized serial data signal 102 that includes N input bits. Using the sampling clock signals, the over-samplers 321-1 through 321-N generate, for each input bit of data, a number N of samples of a unit interval (UI) of data.

The transition detectors 330-1 through 330-N are respectively connected to N over-samplers 321-1 through 321-N, to detect when rise or fall transitions occur at each phase sample. A rise transition is when a bit value is changed from '0' to '1' and a fall transition is when the bit value is changed from '1' to '0' at a phase sample. The outputs of the transition detectors 330-1 through 330-N are respectively fed to counters 340-1 through 340-N which count the number of transitions. The count is performed during a programmable counting period being timed by the timer 370. At the end of the counting period, the outputs of the counters 340-1 through 340-N is respectively input to the comparators 350-1 through 350-N.

Each comparator 350-1 through 350-N translates its respective output to indicate if the sampled phase is inside or outside the eye. With this aim, each comparator 350-1 through 350-N compares the number of counted transitions to a programmable threshold. Counts above the threshold indicate that the sampled phase is outside the eye and counts below the threshold indicate the sampled phase is inside the eye. The term "inside the eye" or "outside the eye" refers to a location of the sampled phase relative to an eye diagram of an equalized signal.

Figure 5:
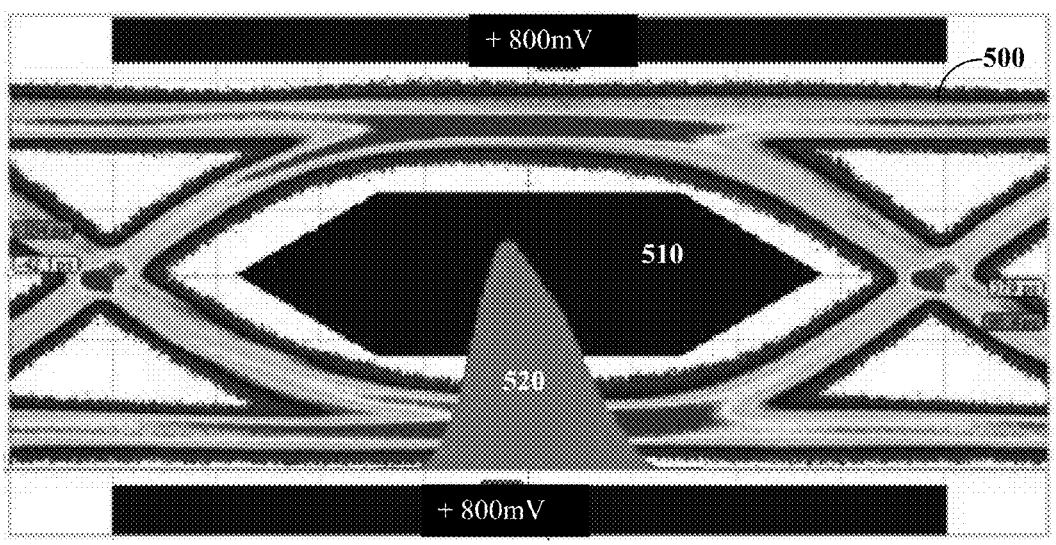
FIG. 5 illustrates a measured eye diagram and a histogram of the eye aperture.

For example, FIG. 5 shows an eye diagram 500 where the hexagon 510 is the delimiter area when the eye is open. The histogram 520 depicts phase samples. At the peak of the histogram 520 (where the histogram's area overlaps with the hexagon 510) are phase samples "inside the eye" where the eye is most open. The histogram's area that does not overlap with the hexagon 510 are phases outside the eye. Phase samples inside the eye are indicative of low number of transitions, hence represent a robust and un-distorted input signal. Phase samples outside the eye are indicative of high number of transitions, hence represent a noisy and attenuated input signal.

In one embodiment of the invention, each of comparators 350-1 through 350-N generates a '0' value for phases inside the eye and '1' for phases outside the eye. Therefore, the output of the comparators 350-1 through 350-N is a pattern that includes N bits.

The pattern analyzer 360 generates the eye width indication 103 by identifying the longest sequence of contiguous phases inside the eye. The length of this sequence is defined as the eye width indication. In accordance with an embodiment of the invention, the pattern analyzer 360 identifies the longest sequence of adjacent zeros in the comparators' 350-1 to 350-N output pattern as the eye width indication.

As mentioned above the decision unit 130 utilizes the received eye width indication 103 to determine the equalization mode of the programmable equalizer 110 that would provide the best equalization, thereby the widest eye width. A non-limiting and exemplary flowchart 400 depicting the process performed by the decision unit is provided in FIG. 4.

In order to find the optimal equalization mode that would achieve the widest eye width, a plurality of equalization modes are tested. The parameters associated with each equalization mode are maintained in the memory 140. The decision unit 130 iteratively sets the programmable equalizer 110 to a different equalization mode. The equalization mode that results the widest eye is set to be the optimal equalization mode for the programmable equalizer 110. The process performed by the decision unit begins when initializing the channel on which serial data is transmitted.

At S410, parameters of a first equalization mode are retrieved from the memory 140. At S420, the programmable equalizer 110 is set with the retrieved parameters. As a result, an input signal 101 is equalized according to the parameters of the new equalization mode and a new eye width indication is computed by the signal quality meter 120. At S430, the computed eye width indication is received at the decision unit 130, which compares, at S440, the received indication to a best eye width indication. The best eye width indication corresponds to an equalization mode that yields the best result, i.e., widest eye indication for equalization modes that have been previously tested. For the first test, the best eye width indication is preconfigured with a default value, e.g., the narrowest eye width.

If the new eye width indication shows improved results over the best width indication, then execution continues with S450 where the best eye width indication is set to be the new eye width indication, thereby the programmable equalizer is set with the optimal equalization mode. Otherwise, execution continues with S460 where it is checked if there are more equalization modes to test. If not, at S470, parameters of a next equalization mode to be tested are retrieved from the memory 140 and execution returns to S420; otherwise, at S480, the equalization mode determined to be the optimal equalization mode is saved in the memory. This can be used to preset the programmable equalizer 110 with the optimal equalization mode when the channel is reinitialized.

In accordance with an embodiment of the invention only a predefined set of equalization modes kept in a sorted list are tested. The sorted list is created by pre-characterizing the behavior of the programmable equalizer 110 in a predefined range of equalization parameters. If the characteristics result in only one maximum eye width within the characterization range, then the equalization modes associated with these parameters are stored in a sorted list, where the equalization modes are sorted according to the progression of the equalization parameters.

According to this embodiment, the decision unit 130 tries parameters associated with equalization modes in the sorted list until the maximum eye width is encountered. The eye width is known to have only one global maximum as a function of the equalization parameters. The maximum eye is not known in advance.

To search the optimal equalization mode in the sorted list, the decision process can first try the equalization mode at one end of the sorted list and progressively check other equalization modes until finding the maximum eye width. Alternatively, the decision process may start the search with an equalization mode located in the middle of the sorted list and try other equalization modes in either direction from the middle of the list. Then a decision is taken toward direction the eye width improves and then progresses in that direction until a maximum eye width is encountered.

The principles of the invention may be implemented as any combination of hardware, firmware, and software. Moreover, the software is preferably implemented as an application program tangibly embodied on a program storage unit or computer readable medium. One of ordinary skill in the art would recognize that a "machine readable medium" or computer readable medium is a non-transitory medium capable of storing data and can be in a form of a digital circuit, an analogy circuit, a magnetic media or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention.

The invention claimed is:

1. An adaptive equalizer for high-speed serial data, comprising:
    a programmable equalizer for equalizing an input serial data signal to generate an equalized serial data signal, wherein the equalization is based on an optimal equalization mode;
    a signal quality meter for computing an eye width indication based on the equalized serial data signal, wherein the eye width indication is an indicative of the quality of the equalized serial data signal, the a signal quality meter includes:
        a clock and data recovery (CDR) circuit for recovering the equalized serial data signal using a number of N over-samplers and a N-phase sampling clock;
        a number of N transition detectors connected to the number of N over-samplers for detecting rise or fall transitions occur at each phase sample;

a number of N counters connected to the N transition detectors for counting the number of transitions during a programmable counting period;

a number of N comparators connected to the N counters for comparing the number of transactions counted by each counter to a programmable threshold, wherein the comparison results determine the location of each phase sample relatively to an eye of an eye diagram;

a pattern analyzer for generating the eye width indication by identifying a longest sequence of contiguous phase samples inside an eye of the eye diagram;

a timer for timing the programmable counting period; and a decision unit for determining the optimal equalization mode based on the eye width indication.

2. The adaptive equalizer of claim 1, further comprising: a memory for storing a plurality of equalization modes.

3. The adaptive equalizer of claim 2, wherein determining the optimal equalization mode further comprising: iteratively setting the programmable equalizer to each of the plurality of equalization modes until the best eye width indication is encountered, wherein the equalization mode that results with the best eye indication is the optimal equalization mode.

4. The adaptive equalizer of claim 3, wherein equalization modes to which the programmable equalizer is set are kept in a sorted list.

5. The adaptive equalizer of claim 4, wherein the sorted list is created by:

characterizing behavior of the programmable equalizer in a predefined range of equalization parameters; and storing the equalization modes associate with the equalization parameters in a sorted order, if only one maximum eye width is detected within the characterization range, wherein the equalization modes are sorted according to progression of equalization parameters.

6. The adaptive equalizer of claim 1, wherein counts of each of the counter above the programmable threshold indicate that a respective phase sample is outside the eye of an eye diagram and counts below the programmable threshold indicate the phase sample is inside the eye of the eye diagram.

7. The adaptive equalizer of claim 1, wherein the serial data signal is transmitted at a transfer rate of at least 3 Giga bit per second (Gpbs) over a physical cable connecting a source device and a sink device.

8. The adaptive equalizer of claim 7, wherein the connection between the sink device and the source device is through high-speed serial interface.

9. The adaptive equalizer of claim 7, wherein the high-speed serial interface includes at least one of DisplayPort, universal serial bus (USB) 3, high-definition multimedia interface (HDMI), peripheral component interconnect (PCI), PCI express PCIe, digital interface for video and audio (DiiVA) and PCI generation 2.

10. A method for adaptively equalizing high-speed serial data, comprising:

equalizing an input serial data signal to generate an equalized serial data signal, wherein the equalization is based on an optimal equalization mode;

generating an eye width indication based on the equalized serial data signal, wherein the eye width indication is an indicative of the quality of the equalized serial data signal; and determining the optimal equalization mode based on the eye width indication by iteratively setting the programmable equalizer to each of a plurality of equalization modes selected from a sorted list, until the best of eye width indication is encountered, wherein the equalization mode that results with the best eye indication is the optimal equalization mode, the sorted list that maintains the plurality of equalization modes is created by characterizing behavior of the programmable equalizer in a predefined range of equalization parameters; and storing the equalization modes associate with the equalization parameters in a sorted order, if only one maximum eye width is detected within the characterization ranqe, wherein the equalization modes are sorted according to progression of equalization parameters.

11. The method of claim 10, wherein generating the eye width indication further comprising:

recovering the equalized serial data signal using a number of N over-samplers and a N-phase sampling clock;

detecting rise or fall transitions occur at each phase sample of the N phase using N transition detectors;

counting the number of transitions at each phase sample during a programmable counting period using a number of N counters, wherein each counts determine the location of each phase sample relatively to an eye of an eye diagram;

comparing the number of transactions of each counter of the N counters to a programmable threshold using a number of N comparators, wherein the comparison results determine the location of each phase sample relatively to an eye of an eye diagram; and generating the eye width indication by identifying a longest sequence of contiguous phases inside an eye of the eye diagram.

12. The method of claim 11, wherein each count above the programmable threshold indicates that a phase sample is outside the eye of an eye diagram and each count below the threshold indicates that the phase sample is inside the eye of the eye diagram.

13. An adaptive equalizer for high-speed serial data, comprising:

a programmable equalizer for equalizing an input serial data signal to generate an equalized serial data signal, wherein the equalization is based on an optimal equalization mode;

a signal quality meter for computing an eye width indication based on the equalized serial data signal, wherein the eye width indication is an indicative of the quality of the equalized serial data signal; and a decision unit for determining the optimal equalization mode based on the eye width indication, the decision unit is further configured to iteratively set the programmable equalizer to each of a plurality of equalization modes selected from a sorted list, until the best of eye width indication is encountered, wherein the equalization mode that results with the best eye indication is the optimal equalization mode, wherein the decision unit is further configured to create the sorted list that maintains the plurality of equalization modes by characterizing behavior of the programmable equalizer in a predefined range of equalization parameters; and storing the equalization modes associate with the equalization parameters in a sorted order, if only one maximum eye width is detected within the characterization range, wherein the equalization modes are sorted according to progression of equalization parameters.

* * * * *